United States Patent [19]

Kaspar

[11] 3,876,866

[45] Apr. 8, 1975

[54] NAVIGATIONAL CALCULATOR

[76] Inventor: Peter Dalzell Kaspar, Dover, Del.

[22] Filed: Sept. 11, 1974

[21] Appl. No.: 505,164

[52] U.S. Cl. .................................................. 235/88
[51] Int. Cl. .................................................. G06c 3/00
[58] Field of Search ............ 235/61 NV, 78 N, 88 N

[56] References Cited
UNITED STATES PATENTS

| 2,916,207 | 12/1959 | Vohland | 235/61 NV |
| 2,996,242 | 8/1961 | Bannister | 235/88 N X |
| 3,193,195 | 7/1965 | Jeffries | 235/88 N X |
| 3,497,678 | 2/1970 | Warner | 235/78 N X |

FOREIGN PATENTS OR APPLICATIONS

| 916,168 | 1/1963 | United Kingdom | 235/61 NV |

Primary Examiner—Lawrence R. Franklin

[57] ABSTRACT

A navigational calculator for solving vector problems has three concentrically mounted rotatable members having cooperating speed scales, an outer 360° compass rose, an inner 360° compass rose and a boat pointer.

5 Claims, 6 Drawing Figures

NAVIGATIONAL CALCULATOR

BACKGROUND OF THE INVENTION

1. Field of the Invention

This invention relates to a simplified navigational calculator for determining direction and speed of the actual wind when the direction and speed of both the boat and the apparent wind are known. It is also useful for solving other problems encountered in navigating boats.

2. Description of the Prior Art

In boating and sail racing it is important to know the direction and velocity of the actual or true wind to determine the apparent wind for any given boat heading and many devices have been proposed for obtaining such information. U.S. Pat. No. 3,625,417 to Slauter describes one such device which comprises as many as seven parts and a somewhat involved method for using it. The American Practical Navigator (Bowditch 1966) discloses additional methods.

SUMMARY OF THE INVENTION

I have now invented a navigational calculator which is simplified in construction and requires but a relatively few steps to operate. For example, when it is desired to find the speed and direction of the true wind and the direction and velocity of both the boat and the apparent wind are known, only three steps are needed with this calculator. Other boating problems may also be solved with a minimum of steps.

Figure 1:
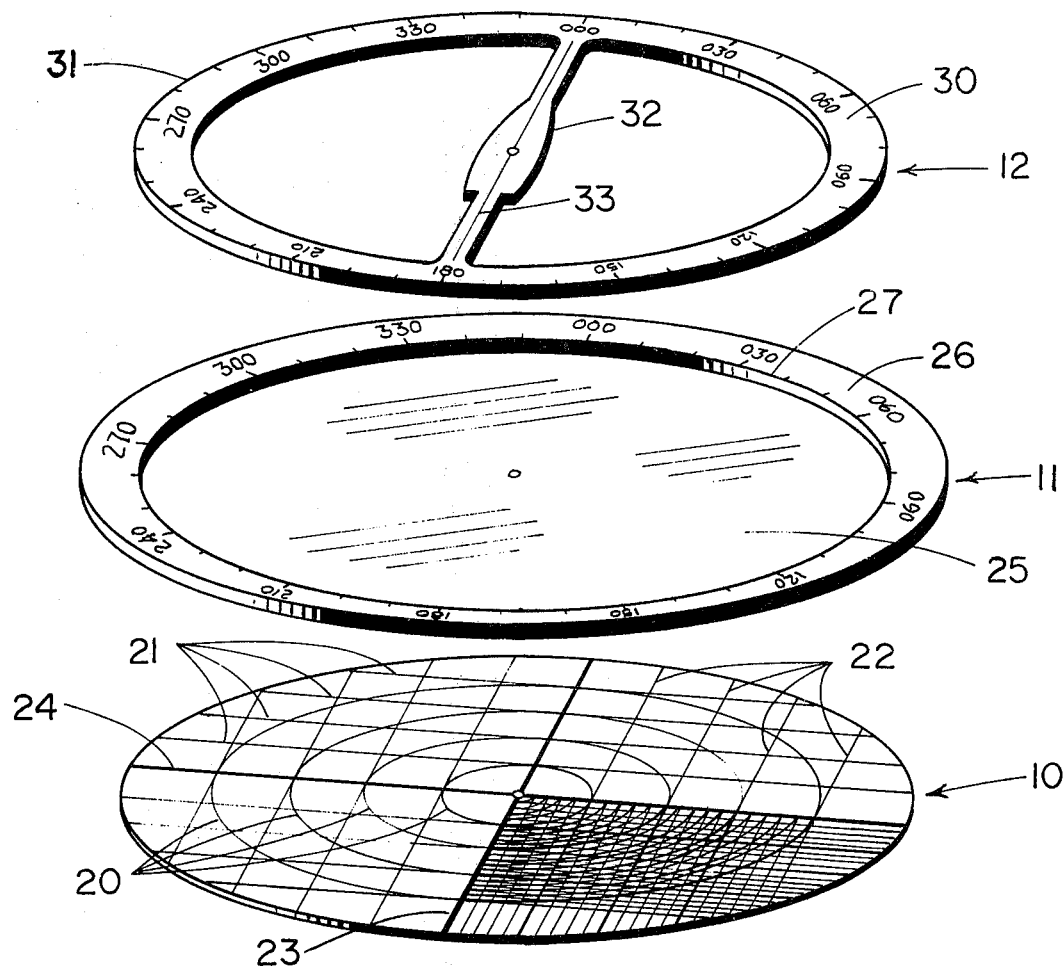
FIG. 1 represents an exploded view in perspective of the calculator which comprises a circular base member 10, an intermediate disc member 11 and an upper, inner ring member 12.

Referring now to the drawings and particularly to FIG. 1 there is shown in exploded view an embodiment of the invention showing the three structural components 10, 11 and 12.

The first structural component is the circular base member 10 which has a series of concentric circles 20 running from the center out to the periphery. It also has a first series of parallel lines 21 and a second series of parallel lines 22 which are perpendicular to the lines 21. These lines serve to form rectilinear grid lines or squares over the entire face of the member 10. For purposes of simplicity in the drawing, only one quadrant of base member 10 shows the complete circles and squares but it is understood that in practice the other quadrants are similarly complete.

The distance between any two consecutive circles equals the distance between any two consecutive parallel lines. The distance between two consecutive circles represents a unit of speed and the distance between two consecutive parallel lines also represents a unit of speed. The unit of speed can be any assigned number either equal to, greater than, or less than unity so that higher or lesser speeds can be handled by the calculator. It is advantageous to make these circles and lines of contrasting colors for ease in reading. It is also advantageous in disc 10 to have two perpendicular grid lines or diameters 23 and 24 passing through the center point of the disc to be accented over the other grid lines and the concentric circles. These diameters, which are the central lines of the aforementioned parallel lines 21 and 22, can be considered as dividing the base disc 10 into four equal segments.

Figure 2:
FIG. 2 is a side view showing the construction of intermediate disc 11.

The second structural component, intermediate disc 11, is made of transparent material with a 360° compass rose circumferentially disposed thereon. In one embodiment the intermediate disc is made of a transparent circular sheet 25 with an opaque compass ring 26 attached thereto, as by glueing. The degrees of the compass ring 26 are disposed so the degree lines extend to the inner edge 27 of the ring 26. The compass ring 26 is used to show the direction of the true wind. The relationship of transparent sheet 25 and ring 26 is more clearly shown in FIG. 2.

Figure 3:
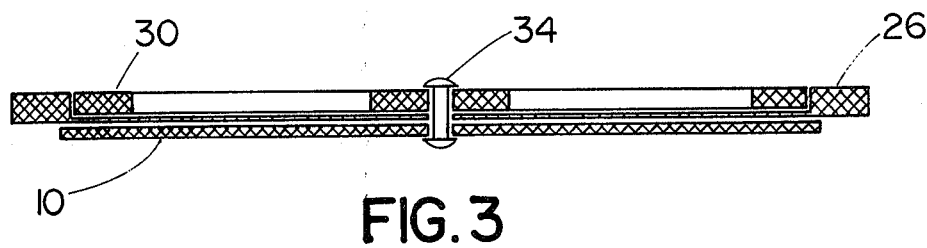
FIG. 3 is a sectional view of the assembled calculator.
Figure 4:
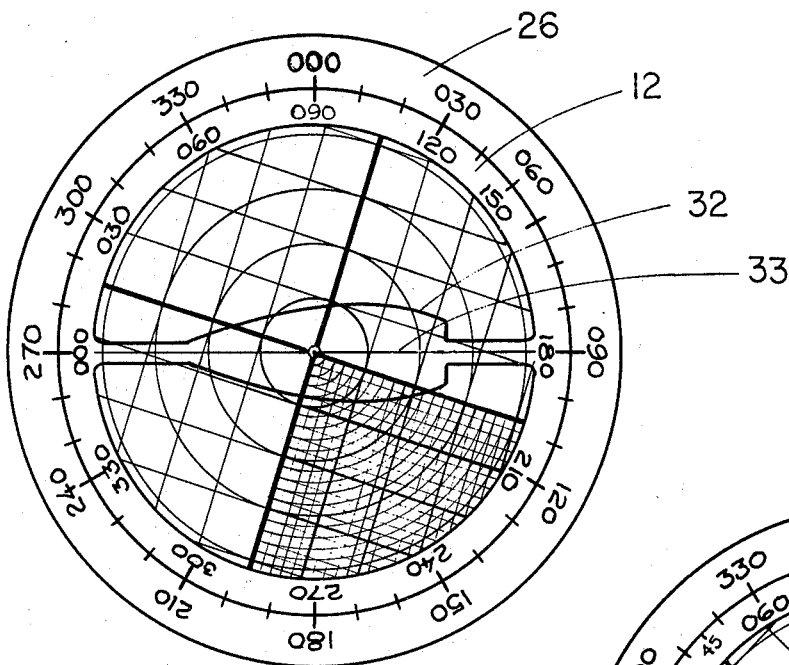
FIG. 4 is a top view of the assembled calculator showing step one in the solution of a boating problem.

The third structural component, inner ring 12, comprises a 360° compass rose 30 with the degree marks extending to the outer edge 31 of the compass rose. The ring 12 has an integral diameter in the shape of a transparent boat pointer 32, the bow of the boat pointing to the 0° mark and the stern point to the 180° mark of the compass rose. The boat point also has an integral diameter 33. It is to be noted that since the boat pointer 32 and compass rose 30 are integral with each other, they rotate as a unit. Ring 12 is smaller in diameter than compass ring 26 of disc 11 so that in the assembled calculator compass rose 30 rotates within compass ring 26, as shown in FIGS. 3 and 4, in abutting relationship. The compass rose 30 is used to show the direction of the apparent wind.

Each of the three components 10, 11 and 12 has a central opening through which a pin, bolt or other fastening device is inserted to hold the three components in aligned and rotatable relationship. Each of the three components is independently rotatable. It is to be understood that any suitable material such as metal, wood, plastic, etc. can be used for making the various parts. It is essential that sheet 25 be made of transparent material so the face of disc 10 is completely visible at all times. The boat diameter can be a very narrow strip in the shape of an arrow or, as previously indicated, in the shape of a boat. The transparent parts of the calculator are made of glass or relatively rigid clear plastic such as Lucite, Mylar, etc. which can be written upon with pencil, ink, crayon or the like. Lucite and Mylar are trademarks of the Du Pont Co.

FIG. 3 is a sectional view illustrating the manner in which the calculator is assembled and held together by a fastening device 34.

FIG. 4 is a top view of the assembled calculator showing a first step in the solution of a boating problem.

Figure 5:
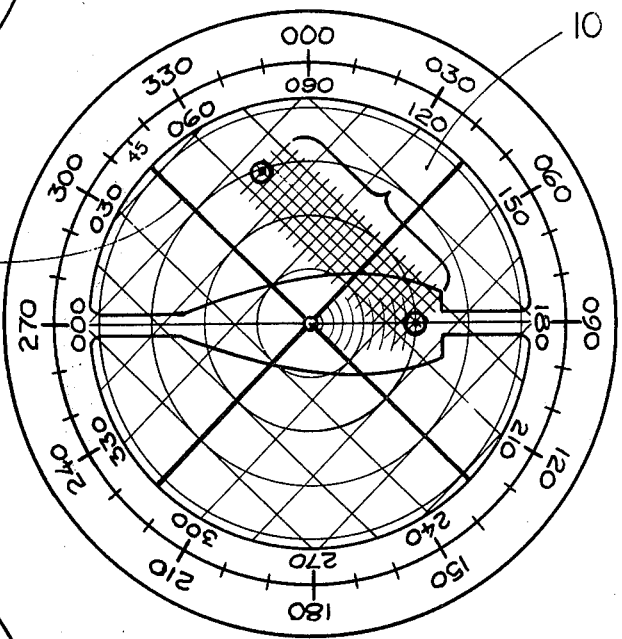
FIG. 5 is a top view of the assembled calculator showing step two in the solution of the problem.
Figure 6:
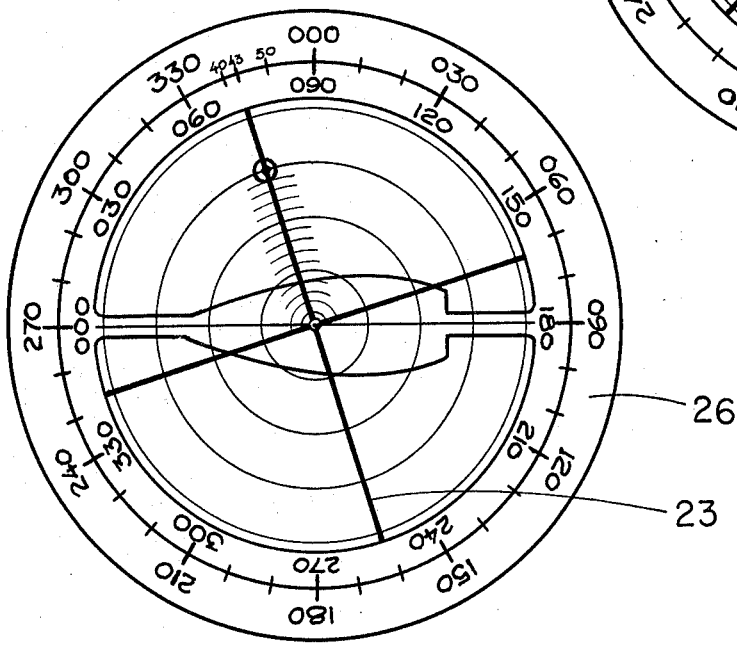
FIG. 6 is a top view of the assembled calculator showing step three in the solution of the problem.

The operation of the calculator will now be described with particular reference to FIGS. 4, 5, and 6. When a boat is heading 270° at a speed of 10 knots and the apparent or relative wind is 045° at a speed of 20 knots, it is desired to determine the direction and velocity of the actual or true wind. The answer is obtained as follows.

1. Rotate the inner ring 12 so the boat pointer 32 and its diameter 33 point to the boat's heading of 270° on the outer ring 26 as shown in FIG. 4.

2. Without disturbing rings 26 or 30, rotate the bottom or base disc 10 until one of the two accented diameters 23 (or 24) points to the apparent wind direction of 045° on the compass ring 30 of inner ring 12, as shown in FIG. 5. Starting from the center point of the calculator and moving toward the stern of the boat pointer 32, count the number of circles corresponding to the boat's speed. Assuming each circle represents 1 knot, count to the tenth circle since the boat's speed has been given as 10 knots. From that point, and moving along an intersecting line which is parallel to the heavy diameter 23 which points to 045°, count 200 squares in the direction of 045° to represent the 20 knot speed of the apparent wind. At the twentieth square make a mark on the transparent sheet 25 with a pencil or other suitable writing instrument. The condition of the calculator at this stage is shown in FIG. 5.

3. Rotate the bottom or base disc 10 once more so the heavy diameter line passes through the aforesaid mark. This diameter now points to the direction of the true wind on the outer ring 26, in this case 343° as shown in FIG. 6. The velocity of the true wind is obtained by simply counting the number of circles between the aforesaid mark and the center of the calculator. In this case the number of circles is seen to be 15 and accordingly the velocity of the true wind is 15 knots.

It is thus apparent that in three moves and the making of but one mark on the calculator the answer to the problem is obtained in a very rapid manner.

Other navigational problems can also be solved with the calculator. For example, when the speed and direction of both the boat and the true wind are known, it is possible to ascertain the direction and speed of the apparent wind. This is useful information in determining what sail should be hoisted when the boat rounds the mark. It is assumed the true wind has a direction of 343°, has a speed of 15 knots, the new boat heading upon rounding the mark wilkl be 30° and the boat speed will be 7 knots per hour. The solution is obtained as follows.

1. Rotate the circular base member 10 so one of the accented diameters 23 or 24 points to 343° on the outer ring 26. Starting from the center point of the calculator and going toward the 343° mark, place a pencil mark on that diameter at the point where it intersects the 15 knot speed circle. This mark can be referred to as the true wind mark.

2. Next, without disturbing the base member 10 or the intermediate disc 11, rotate the boat diameter 33 and the boat pointer 32 until the front of the pointer points to 30° on the outer ring 26. Starting from the center point of the calculator and moving toward the back end of the p pointer, put a pencil mark on the transparent boat pointer 32 at the point where the boat diameter 33 intersects the 7 knot speed circle. This second mark can be referred to as the boat mark.

3. Rotate only the circular base member 10 once more so one of the aforementioned parallel lines runs through, or as close as possible to, each of the said two pencil marks. One of the accented diameters 23 or 24 will now be parallel to the line running through the two marks and that diameter, sighting in the direction of the first mark, will be pointing to the apparent wind direction on the compass rose on the inner ring 30. In this case that direction will be seen to be 328°. The number of speed marks between the two pencil marks will be the speed of the apparent wind, in this case, about 20 knots.

It should be noted that while the outer ring 26 has been referred to as the "true" ring, it can be used to designate magnetic headings instead. If so used, the wind direction will be a magnetic heading rather than a true direction.

I claim:

1. A navigational calculator for use in boating comprising
   a circular base member having a series of concentric circles and rectilinear grid lines the distance between any two consecutive circles equalling the distance between any two consecutive parallel lines of the grid;
   an intermediate transparent disc member with a 360° compass rose circumferentially located thereon; and
   an upper, inner ring member carrying a 360° compass rose on its circumference and having an integral diametral member running from the 0° mark, through the center of the circle defined by the ring, to the 180° mark of the compass rose;
each of the aforesaid members being mounted on a common central axis and rotatable with respect to each other, the said inner ring member having a diameter smaller than that of the intermediate disc member so their respective compass roses rotate in abutting relationship.

2. A calculator according to claim 1 wherein the diametral member of the said inner ring member is transparent.

3. A calculator according to claim 2 wherein the transparent diametral member is in the shape of a boat, the bow pointing to the zero degree mark and the stern pointing to the 180° mark.

4. A calculator according to claim 1 wherein the circumferential area of the intermediate disc carrying the compass rose is opaque.

5. A calculator according to claim 1 wherein the two perpendicular grid lines passing through the center of the circular base member are accented over the other gird lines.

* * * * *